United States Patent [19]

Abe

[11] 4,379,129
[45] Apr. 5, 1983

[54] METHOD OF DECOMPOSING OZONE

[75] Inventor: Akira Abe, Minami-ashigara, Japan

[73] Assignee: Fuji Xerox Co., Ltd., Tokyo, Japan

[21] Appl. No.: 208,770

[22] Filed: Nov. 20, 1980

Related U.S. Application Data

[62] Division of Ser. No. 794,151, May 5, 1977, abandoned.

[30] Foreign Application Priority Data

May 6, 1976 [JP] Japan ................................. 51-50930

[51] Int. Cl.³ ............................................. B01D 53/36
[52] U.S. Cl. ................................... 423/210; 252/447; 250/324; 250/325; 355/18
[58] Field of Search ................ 423/210, 219; 252/447; 250/324, 325, 326; 355/8, 18

[56] References Cited

U.S. PATENT DOCUMENTS

| | | | |
|---|---|---|---|
| 2,203,188 | 6/1940 | Beer | 423/210 |
| 2,298,607 | 10/1942 | Anderson | 423/210 |
| 2,980,494 | 4/1961 | Jenkins et al. | 423/210 |
| 3,151,943 | 10/1964 | Fujimoto et al. | 423/219 |
| 3,269,801 | 8/1966 | Boberg et al. | 423/210 |
| 3,675,096 | 7/1972 | Kiess | 250/325 |
| 4,143,118 | 3/1979 | Laing | 423/210 |

*Primary Examiner*—Earl C. Thomas
*Attorney, Agent, or Firm*—Sughrue, Mion, Zinn, Macpeak & Seas

[57] ABSTRACT

A catalyst capable of decomposing ozone comprising active carbon with silver deposited on the surfaces thereof.

11 Claims, No Drawings

METHOD OF DECOMPOSING OZONE

This is a division of application Ser. No. 794,151, filed May 5, 1977, now abandoned.

BACKGROUND OF THE INVENTION

1. Field of the Invention

This invention relates to an ozone-decomposing catalyst for efficiently decomposing ozone.

2. Description of the Prior Art

In electrophotographic duplicating machines generally employed, it is a common practice to uniformly charge one surface of a photoconductive electrically insulating layer formed on an electrically conductive support using a system wherein a high voltage is applied between fine lead wires to cause a corona discharge therebetween and the photoconductive electrically insulating layer is passed into the charging zone to impart an electric charge to the layer. In an electrophotographic duplicating machine using a charging system of the type just mentioned, the corona discharge takes place in the air, so that ozone is readily produced by reaction of oxygen molecules in the air with both the charged particles accelerated by the discharge field and the activated particles of oxygen produced as a result of the non-elastic collision of oxygen molecules. The air containing the thus produced ozone is forcibly exhausted from the duplicating machine by means of an exhaust device provided within the machine.

Ozone has a strong oxidizing action, and numerous uses have been therefore proposed in sterilization of air which may contain germs suspended therein, deodorization of air, etc. Ozone generally gives off an intensely strong odor and may cause physiologically adverse effects such as shortness of breath, dizziness, headache, nausea, etc., even if ozone is present in the air at a concentration as small as about 0.1 ppm. Accordingly, it cannot be said positively that ozone is harmless to the human body. Thus, a duplicating machine using a corona discharge as an office machine has a disadvantage due to the generation of ozone.

In order to remove the ozone discharged from an electrophotographic duplicating machine, a number of methods have been proposed, e.g., a method, as disclosed in U.S. Pat. No. 2,203,188, for decomposing ozone into innoxious oxygen by passing the ozone-containing air in an exhaustion step through an ozone decomposing catalyst-packed bed, or an ozone decomposing catalyst-deposited on a non-woven fabric or filter layer, a method, as disclosed in U.S. Pat. No. 2,980,494, for decomposing ozone wherein an ozone decomposing catalyst is fixedly deposited on the surfaces of blades of an exhaust fan or blower of an exhaust device provided within the electrophotographic duplicating machine to permit the ozone-containing air to be efficiently brought into contact with the catalyst due to the high velocity revolution of the blades, a method, as disclosed in U.S. Pat. No. 2,298,607, for decomposing ozone wherein an ozone decomposing catalyst is fixedly deposited on the surfaces of a shield case of a discharging device to allow the ozone to be decomposed immediately after generation, etc. Known ozone decomposing catalysts used in these methods include manganese dioxide; lead peroxide; other metal oxides such as chromium, cobalt, copper, nickel, and a mixture thereof; metals such as nickel, rhodium, etc. However, these ozone decomposing catalysts all have a low ozone decomposing efficiency and a short life. There is accordingly a strong demand for an ozone decomposing catalyst which overcomes the above disadvantages.

SUMMARY OF THE INVENTION

Therefore, an object of the present invention is to provide an ozone decomposing catalyst which is inexpensive, which has a very high ozone decomposing efficiency and which has a long life.

The object of this invention is obtained by a catalyst capable of decomposing ozone comprising active carbon having silver deposited on the surfaces thereof.

DETAILED DESCRIPTION OF THE INVENTION

The method for preparing the ozone decomposing catalyst according to the invention is described in detail hereinbelow.

Active carbon is introduced into a container containing a 10% by weight nitric acid aqueous solution placed in a hot water (at 50° to 60° C.) bath for treatment for about 2 to about 3 hours, followed by a filtering and a washing sufficiently with water. A suitable active carbon which can be used in this invention is one having a particle size of 4 mesh or less and a specific surface area of about 700 to about 1,500 m$^2$/g. Such can be suitably made from coconut shells. However, the above is merely exemplary and the active carbon which can be used in this invention is not to be construed as being limited thereto.

The thus washed active carbon is then mixed with a small amount of water, to which is added a predetermined amount of a silver nitrate solution to allow the silver nitrate to adsorb on the active carbon, followed by adding an alkali such as sodium hydroxide to render the solution alkaline, e.g., to a pH of about 10 to 12, preferably about 10.5 to 11.5, and adding a reducing agent such as formaldehyde dropwise thereto with agitation. Further, an excess of the reducing agent is added to the solution, followed by allowing the solution to stand for about 1 to about 2 hours to deposit silver on the surfaces of the active carbon by reduction. The amount of silver nitrate and the amount of alkali will vary depending upon the amount of silver to be deposited on the surfaces of active carbon and the amount of water used also will vary depending upon the particle size of active carbon (e.g., whether grains or powders are used). The concentrations of the silver nitrate solution and the alkaline material employed thus cannot be defined unequivocally but suitable amounts can be easily determined by one skilled in the art. The amount of the reducing agent also will vary depending upon the amount of silver nitrate used, and one skilled in the art can easily choose an appropriate amount of reducing agent to be used on considering the amount of silver nitrate employed. Suitable alkalis such as potassium hydroxide, aqueous ammonia, etc., can be employed in addition to sodium hydroxide, and hydrazine hydrate, sodium borohydrate, hydroxylamine hydrochloride can also be employed in place of the formaldehyde as a reducing agent.

After completion of the reduction, the silver-deposited active carbon is filtered, washed with water, and dried at about 100° to about 110° C. to obtain an ozone decomposing catalyst. The amount of silver to be deposited on the active carbon may be varied as desired based on the amount of the silver nitrate solution. Generally, the amount of the silver deposited on the active carbon ranges from about 0.005 to about 10% by weight based on the weight of the active carbon.

When applied in an ozone decomposing device of an electrophotographic duplicating machine, the ozone decomposing catalyst thus prepared has been found to have a superior ozone decomposing efficiency and a longer life to known ozone decomposing catalysts. The ozone decomposing catalyst of this invention can be used in a variety of forms, for example, fixed to a fibrous material such as glass fibers, in a catalyst bed, etc.

The present invention is particularly illustrated in greater detail by reference to the following examples. Unless otherwise indicated herein, all parts, percentages, ratios and the like are by weight.

EXAMPLE 1

10 g of an ozone decomposing catalyst obtained by depositing 2 wt% silver on the surfaces of active carbon powder, which is a powdery catalyst having a particle size of 325 mesh or less, (hereinafter referred to simply as 2% silver-deposited active carbon) was mixed and kneaded with 30 cc of toluene, to which was further added a solution of 2 g of a styrene resin binder (HF-55, a trademark of Mitsubishi Monsanto Chemical Co., Ltd.) in 30 cc of toluene, followed by sufficient agitation to form a uniform dispersion. The uniform dispersion was sprayed onto a glass fiber filter for coarse dust in an amount of 3 g of the catalyst per 100 $cm^2$ of the glass fiber filter to produce an ozone decomposing catalyst-deposited filter or ozone decomposing filter.

The ozone decomposing filter having a filter area of 470 $cm^2$ was set in a test device having an exhaust rate of 1.5 $m^3$ per min as is generally exhausted in known electrophotographic duplicating machines. When air containing 0.15 ppm of ozone was continuously passed through the filter, the initial efficiency of decomposition of the ozone decomposition filter reached 98% and that after 30 hours was 81-82%. Thus, the ozone decomposition catalyst of the invention was found to have an excellent ozone decomposition efficiency and excellent life characteristics.

Further, similar results were obtained when 0.5% silver-deposited active carbon catalyst was used instead of the 2% silver-deposited active carbon catalyst and also when other resins having a binding property such as a vinyl chloride-vinyl acetate copolymer, a vinylidene chloride-acrylonitrile copolymer or the like were used instead of the styrene binder.

COMPARATIVE EXAMPLE (Prior Art)

For comparative purposes, 2 wt% palladium was deposited on an active carbon powder having the same particle size as that of the 2% silver-deposited active carbon of Example 1 (hereinafter referred to simply as 2% palladium-deposited active carbon catalyst). Further, manganese dioxide and a composite metal oxide composed of copper-chromium-cobalt oxides each having the same particle size as the catalyst of Example 1 were respectively subjected to testing for ozone catalytic decomposition in the same manner as in Example 1, using 3 g of the catalytic component per 100 $cm^2$ of the glass fiber filter for coarse dust.

Upon determining the initial ozone decomposing efficiency and life characteristics of the respective ozone decomposing filters, it was found that the manganese dioxide and the composite metal oxide each had an initial ozone decomposing efficiency of as low as 50% and the activity of these catalysts was considerably reduced on use, i.e., the ozone decomposing efficiency after 15 hours was as small as 10%. Further, although the 2% palladium-deposited active carbon catalyst had the same level of the initial ozone decomposing efficiency as the 2% silver-deposited active carbon catalyst of Example 1, the decomposition activity of the 2% palladium-deposited active carbon catalyst was reduced with the lapse of time, i.e., the ozone decomposition efficiency after 30 hours was 62%. The reduction in catalytic activity of the 2% palladium-deposited catalyst was much more rapid than that of the 2% silver-deposited active carbon catalyst of the invention.

EXAMPLE 2

A catalyst obtained by depositing 0.1 wt% silver on the surfaces of 8-12 mesh active carbon particles was densely packed in a thickness of 10 mm in a suitable means with a filtration area of 470 $cm^2$ to produce an ozone decomposing filter. Then, the procedures of Example 1 were repeated to determine the catalyst characteristics. As a result, it was found that although the pressure loss of the ozone decomposing filter was higher than that of the glass fiber filter deposited catalyst of Example 1, the packed filter had very excellent ozone decomposing characteristics, i.e., the initial ozone decomposition efficiency was more than 99% and the decomposition efficiency after 30 hours was maintained at as high as 95%, after which the activity of the packed filter was hardly reduced, with excellent life characteristics.

EXAMPLE 3

The following three kinds of ozone decomposing filters were produced.

(A) Ozone decomposing filter of the same type as produced in Example 1 using a 2% silver-deposited active carbon catalyst (hereinafter referred to as A-Filter).

(B) Ozone decomposing filter obtained by depositing silver on a glass fiber filter for coarse dust in an amount of 0.5 g per 100 $cm^2$ of the filter using an electroless plating method (hereinafter referred to simply as B-Filter).

(C) Ozone decomposing filter similar to the A-Filter but using carbon powder with the same particle size instead of the 2% silver-deposited active carbon catalyst (hereinafter referred to as C-Filter).

Each of these three kinds of the ozone decomposing filters (each having a filtration area of 470 $cm^2$) were subjected to the characteristic measurements using the test device of Example 1 and a practically employed electrophotographic duplicating machine. The test results obtained are shown in Table 1 below.

TABLE 1

| Catalyst | Test Device | | Electrophotographic Duplicating Machine | |
|---|---|---|---|---|
| | Decomposition* (Initial) | Decomposition** (80(H)) | Decomposition* (Initial) | Decomposition*** (80H-(copies)) |
| A-Filter | 98% | 31 Hrs | 96% | 29,000 copies |
| B-Filter | 87% | 5 Hrs | 85% | 2,400 copies |
| C-Filter | 91% | 3 Hrs | 92% | 1,800 copies |

*Decomposition (initial): Ozone decomposition rate initially
**Decomposition 80 (H): Time required for the ozone decomposition rate to be reduced to 80%.
***Decomposition 80 (copy): Number of copies taken before the ozone decomposition rate reached 80%.

As is clear from the results in Table 1 above, when determined by the test device, the B- and C-Filters using silver and active carbon, respectively, had initial ozone decomposing rates of 87% and 91%, respectively. Further, the times required for the ozone decomposing rate to be reduced to 80% were 3 hours for the C-Filter and 5 hours for the B-Filter, respectively. On the other hand, the A-Filter of the invention using the 2% silver-deposited active carbon catalyst had an initial ozone decomposition rate as high as 98% although the amount of silver used in the A-Filter was 1/10 time as small as that used in the B-Filter. Additionally, the time required for the ozone decomposing rate to be reduced to 80% was as long as 31 hours, which was six times longer than that for the B-Filter and ten times longer than that for the C-Filter. Thus, the decomposing catalyst of the invention had extremely excellent catalyst characteristics, i.e., initial ozone decomposition rate and life.

Moreover, when the three kinds of filters were placed in the outlet of the exhaust of an electrophotographic duplicating machine, the initial ozone decomposition rates of the A-Filter, the B-Filter and the C-Filter were almost the same as those obtained in the test device. As for the number of copies taken before the ozone decomposition rate was reduced to 80%, which number was used as a measure of the life of the filter, the number of copies for the A-Filter using the ozone decomposing catalyst of the invention was 29,000, which was 12 times larger than that for the B-Filter and 16 times larger than that for the C-Filter. The A-Filter ensured a markedly prolonged life time as compared with the other filters upon application to an electrophotographic duplicating machine.

The ozone decomposing catalyst of the invention obtained by depositing a small amount of silver on surfaces of active carbon is found to give rise to synergistic improvements in the ozone decomposition rate and life time in comparison with the ozone decomposing catalyst using either active carbon or silver alone. In addition, the ozone decomposing catalyst of the invention is particularly effective in treating an exhaust which contains a thermally decomposed gaseous material produced from paper or fuser oil upon fixation of an image in an electrophotographic duplicating machine. The reason why active carbon having silver deposited on surfaces thereof exhibits excellent characteristics is not presently known. However, in this connection, when silver alone is used as an ozone decomposing catalyst, the thermally decomposed gaseous materials produced upon fixation are adsorbed and deposited on the surfaces of the silver, thus the silver being contaminated with the decomposed material to a greater extent with the lapse of time, with the catalytic activity being reduced abruptly. In contrast thereto, with the ozone decomposing catalyst of the invention, it is believed that various kinds of the thermally decomposed gaseous materials are selectively adsorbed on the active carbon to prevent the silver surface from being contaminated, so that the catalyst remains in a state where catalytic activity is ensured over a long period of time, and thus accordingly has a long life time.

In the above examples, although the application of the ozone decomposing catalyst of the invention to an electrophotographic duplicating machine has been particularly described, the ozone decomposing catalyst of the invention is not limited only to applications as an ozone decomposing filter and many changes may be made without departing from the spirit and scope of the invention. For example, in order to decompose ozone discharged from an electrophotographic duplicating machine, the catalyst of the invention may be applied to a suitable area such as an exhaust duct surface, an exhaust fan surface or an area of the duplicating machine where ozone is present at high concentration such as the inner surfaces of a corona discharger. Further, the ozone decomposing catalyst of the invention may be applied to any apparatus other than the electrophotographic duplicating machine where ozone is generated.

As will be understood from the foregoing, the ozone decomposing catalyst of the invention is far superior in ozone decomposition rate or efficiency and life time to known ozone decomposing catalyst, particularly an ozone decomposing catalyst using silver alone, although the amount of silver in the catalyst of the invention is much smaller than a catalyst of silver alone. The catalyst of the invention is particularly effective in treating the exhaust derived from an electrophotographic duplicating machine and containing various kinds of gaseous materials other than ozone, with excellent life characteristics.

Moreover, since the ozone decomposing catalyst of the invention decomposes ozone in an efficient manner even when used in a smaller amount than known ozone decomposing catalyst, a smaller amount of the catalyst of the invention will suffice to remove ozone in the exhaust step of a duplicating machine. In addition, use of such a small amount of the catalyst ensures the ability to fabricate an ozone decomposing filter with much reduced pressure loss, so that the ozone decomposing filter may be mounted as it is in an existing electrophotographic duplicating machine without causing any difficulties such as temperature increase in the duplicating machine due to a decrease in air exhaust volume from the duplicating machine, thus requiring no change in construction of existing machines.

Further, the ozone decomposing catalyst of the invention is advantageous from the viewpoint of economy since the catalyst of the invention produces an excellent catalytic result only using a small amount and the catalyst uses silver which is far less expensive in comparison with a noble metal such as platinum or palladium.

While the invention has been described in detail and with reference to specific embodiments thereof, it will be apparent to one skilled in the art that various changes and modifications can be made therein without departing from the spirit and scope thereof.

What is claimed is:

1. A process for decomposing ozone discharged from an electrophotographic duplicating machine, which comprises contacting the discharged ozone with a catalyst comprising active carbon with silver deposited on the surface thereof.

2. The process of claim 1, wherein said active carbon is an active carbon having a surface area of about 700 to about 1,500 m$^2$/g.

3. The process of claim 1, wherein the amount of silver deposited on the surfaces of said catalyst ranges from about 0.005 to about 10% by weight based on the weight of the active carbon.

4. The process of claim 1, wherein said catalyst comprises a bed of said catalyst in particulate form.

5. The process of claim 1, wherein said catalyst is attached to a fibrous material as a filter.

6. The process of claim 1, wherein said catalyst is applied to an exhaust duct surface of the duplicating machine.

7. The process of claim 1, wherein said catalyst is applied to an exhaust fan surface of the duplicating machine.

8. The process of claim 1, wherein said catalyst is applied to the inner surfaces of a corona discharger.

9. A process for decomposing ozone contained in exhaust air discharged from an electrophotographic duplicating machine, which comprises passing the ozone-containing air through an ozone decomposing filter containing a catalyst comprising active carbon with silver deposited on the surface thereof.

10. The process of claim 9, wherein said catalyst comprises a bed of said catalyst in particulate form.

11. The process of claim 9, wherein said catalyst is attached to a fibrous material as a filter.

* * * * *